2,901,370

ANTISTRIPPING AGENTS FOR BITUMINOUS MATERIALS

Eugene A. Kent, Argo, and Louis J. Sacco, Jr., Chicago, Ill., assignors to National Aluminate Corporation, Chicago, Ill., a corporation of Delaware No Drawing. Application July 22, 1957
Serial No. 673,126

2 Claims. (Cl. 106—123)

This invention, in general, relates to 1,2-substituted imidazoline additives for bituminous materials for improving the antistripping properties of bituminous substances on aggregate, and to bituminous materials, such as bitumen, asphalt, and coal tar, containing 1,2-substituted imidazoline compounds derived from the condensation of polyalkylene polyamines and tall oil fatty acids. Bitumen, asphalt, tar and similar asphaltic or bituminous products are most widely used in the construction of roads, dams, air strips, etc., where mechanical strength and resistance to weather are important considerations. In the most familiar application, the construction of roadways, the bituminous materials are mixed with aggregate, which usually consists of siliceous inorganic particles such as river gravel, quartz, sand, rhyolite, crushed granite, etc. The bituminous material is used to cement the aggregate bodies in a smooth, continuous form. Other prevalent industrial applications of bituminous materials includes their employment as coatings on metals, such as pipes and exposed structural forms, to protect the metal against corrosion.

One of the basic problems with asphalt materials is that, in many cases, the asphalt is attacked by water and is actually separated ("stripped") from the surface to which it should be bonded, aggregate in the one foregoing case or metal in the other. Some scientists attribute this stripping effect to the failure of the hot asphalt, in admixture with the aggregate, for example, to thoroughly wet the aggregate and thus form an imperfect bond with the aggregate. This failure to wet is thought by some to be due to the presence of a film of moisture on the aggregate surface and also in the exposed interstices of the aggregate. The water being immiscible with the asphalt, and being held on the asphalt surface by surface tension, prevents the asphalt from binding itself securely to the aggregate surface.

There are instances, however, where certain asphalts, bitumens, etc., appear to have natural wetting properties when the hot asphalt is mixed with the aggregate—yet even these asphalts are susceptible to being stripped off readily when the asphaltic concrete is solidified by cooling and thereafter subjected to the action of moisture.

The additives of the instant invention serve the function of antistripping agents by preventing to a large extent the stripping action of moisture at the aggregate surface. It may be that their function is in the nature of a preferential asphalt wetting agent, i.e., an agent which breaks down the water film on the aggregate surface to enable the asphalt to form a more tenacious bond with the aggregate, or the additives may be more in the nature of binding agents between the asphalt and the aggregate, or they may serve both functions. In any case, the important factor is that the additives of the instant invention are highly efficient in preventing the stripping of the asphalt from the aggregate by the action of moisture.

It is recognized that certain imidazolines have been proposed as antistripping agents for bituminous materials. For example, Blair et al. Patent No. 2,766,132, issued October 9, 1956, describes 1,2-substituted imidazoline antistripping agents having a hydrocarbon substituent in the 2-position and, in the 1-position, a polyethylene polyamino substituent having at least three amino groups. The 1,2-substituted imidazoline antistripping agents of the present invention, derived by the condensation reaction of tall oil fatty acids and a mixture of polyalkylene polyamines, consisting for the most part of diethylenetriamine are somewhat similar to the imidazolines disclosed in the aforesaid Blair et al. patent, differing primarily in the nature of the substituents in the 1- and 2-positions and have been found to be the most effective imidazoline-type of antistripping agents which we have tested.

In general, the 1,2-substituted imidazolines may be described as the reaction product of a tall oil fatty acid mixture containing at least 70% by weight of fatty acids having a molecular weight of the range of 235–280 and a polyalkylene polyamine mixture consisting essentially of 75–90% diethylenetriamine, 5–15% triethylenetetramine and 5–10% tetraethylene pentamine. The said reaction product is prepared by heating the tall oil fatty acids and the polyalkylene polyamine mixture at 160–190° C. for 60–90 minutes, then at 190–225° C. for 210 to 360 minutes and finally at 225–250° C. for 210–270 minutes. The resulting product is essentially a 1,2-substituted imidazoline, the substituent in the 2-position being a hydrocarbon radical consisting of the hydrocarbon residue of the tall oil fatty acids and the substituent in the 1-position being the residue of the polyalkylene polyamine which has not been reacted to form the heterocyclic imidazoline ring. The final reaction product must analyze 85–99% glyoxalidine ring closure and 88–99% total titratables, hereinafter defined.

The acid components of tall oil fatty acid mixtures consist essentially of 14–18 carbon acids. The unsaturated acids, oleic and linoleic acids, are the predominant acid components. Myristic acid, palmitic acid, heptadecanoic acid, stearic acid, and linolenic acid are usually present as the minor constituents. The rosin acids, if any, are present only in small amounts. The tall oil fatty acids may contain neutrals up to 30% by weight of the total acid mixture.

The polyalkylene polyamines employed in the instant invention are commercial mixtures of polyalkylene polyamines and may contain minor amounts of ethylene diamine, the latter preferably not exceeding 5%. The polyalkylene polyamines are preferably those having 3–5 amino groups (diethylenetriamine, triethylenetetramine and tetraethylenepentamine) in which the diethylenetriamine content is at least 75% of the total. Hence, the predominating constituent of the polyalkylene polyamine mixture is diethylenetriamine.

The invention will be further characterized by the following specific embodiment of the 1,2-substituted imidazoline antistripping agents contemplated by the instant invention.

About 0.5 gram mol of Pamak Light Ends tall oil fatty acids, Hercules Power Company, having the following typical analysis:

| | |
|---|---|
| Acid number | 159.2 |
| Rosin acids _____ percent__ | 0.6 |
| Fatty acids _____ do____ | 79.8 |
| Saponification number | 162.2 |
| Saponifiables (AOCS) _____ percent__ | 21.0 |
| Neutrals _____ do____ | 21.5 |
| Specific gravity, 25/25 | 0.9140 |
| Iodine number | 150.0 |

Acid analysis:

| | | |
|---|---|---|
| Stearic acid | percent | 1.6 |
| Oleic acid | do | 40.1 |
| Myristic acid | do | 0.4 |
| Palmitic acid | do | 13.8 |
| Heptadecanoic acid | do | 2.7 |
| Linolenic acid | do | 0.3 |
| Linoleic acid | do | 31.2 | and 1.0 gram mol of a polyalkylene polyamine mixture consisting of 1.0% ethylene diamine, 80% diethylenetriamine, 12% triethylenetetramine, and 7% tetraethylenepentamine were mixed and heated at steadily increasing temperatures for a total of 9¼ hours. The aqueous distillate was removed from the reaction vessel and collected, the total amount being 21.5 grams. The observations made during the reaction are as follows:

TABLE I

| Minutes | Temp., °C. | Aqueous Distillate, cc. |
|---|---|---|
| 0 | 159 | 0.0 |
| 10 | 167 | 0.8 |
| 15 | 175 | 5.5 |
| 35 | 183 | 8.5 |
| 55 | 188 | 10.0 |
| 70 | 191 | 11.0 |
| 0 | 191 | 0.0 |
| 20 | 201 | 1.8 |
| 40 | 207 | 3.5 |
| 80 | 212 | 4.5 |
| 130 | 215 | 5.0 |
| 250 | 228 | 8.0 |
| 0 | 228 | 8.0 |
| 50 | 230 | 8.0 |
| 80 | 234 | 9.0 |
| 160 | 237 | 10.5 |
| 205 | 247 | 0 |
| 235 | 247 | 0 |

The product obtained had a 99% ring closure and a neutralization equivalent of 230 (theoretical 211).

The analysis for ring closure, expressed as percent glyoxalidine, is conducted by weighing two samples, by difference, to the nearest milligram into 250 milliliters glass stoppered Erlenmeyer flasks. The sample size should be between 1.8 and 2.0 grams. Fifty milliliters of anhydrous isopropanol (99%+) is added to each flask containing the weighed sample and the contents and are swirled to dissolve the sample. The flasks are then placed in an ice bath and cooled to 0°±5° C. To the cooled solution is added 25 milliliters of chilled, diluted phenyl isothiocyanate in anhydrous isopropanol (one part by volume phenyl isothiocyanate to 19 parts by volume anhydrous isopropanol). The samples are allowed to stand at 0°±5° C. for 30 minutes, after which to each flask is added 10 drops of thymol blue indicator. The samples are titrated immediately with standard 0.1 N HCl in anhydrous isopropanol to the first permanent red end-point. The exact end-point, which may be obscured by the color of the sample, may be obtained by comparison with a suitable solution of the original material.

A similar titration is run on a series of blanks and the average milliliters of the standard HCl to bring the samples to the first permanent red end-point is determined. The total glyoxalidine, expressed as percent by weight, of the product is calculated by subtracting the milliliters of HCl required for the blank from the milliliters of HCl required for the sample and multiplying the difference by the normality of the HCl times the quotient of the molecular weight of the imidazoline divided by 1,000 times 100, the total product being divided by the weight of the sample in grams.

The total titratables are determined in a similar manner to the foregoing ring closure analysis, with the exception that the phenyl isothiocyanate is not added to the samples. The percent titratables is calculated by the difference between the milliliters of HCl required for the sample and average milliliters HCl required for the blank and thereafter multiplying this difference by the normality of the HCl times the quotient of the molecular weight of the imidazoline divided by 1,000 times 100, the total product being divided by the weight of the sample in grams. The "total titratables" analysis consists of a titration with alcoholic HCl. Using this data and the molecular weight of the desired imidazoline, a calculation is made which gives the percent of imidazoline which would be present if all of the titratables were imidazoline. This figure is called total titratables and preferably should be close to 100%. The ring closure analysis involves the tying up of the primary and secondary amines with phenyl isothiocyanate. The thio ureas produced are not titratable. Therefore, only tertiary amines are left to be titrated. As the imidazoline is the only tertiary amine present, a titration at this point gives the quantity of imidazoline present. This percentage is called "ring closure."

*Evaluation of antistripping properties*

The antistripping properties of the asphalt additives of the instant invention will be shown in the following tests. Antistripping tests of asphalt were run according to the procedure printed in March 1955 by the Department of Public Works of the Commonwealth of Massachusetts. The procedure is outlined as follows: 100 grams of asphalt is weighed into a round, half pint point can warmed up in an oven at a temperature of 200–250° F. (94°–120° C.). 0.3 gram of the additive is then added to the asphalt, which is stirred with a mechanical stirrer until a homogeneous mixture is reached. The mixture is then placed in an oven at a temperature approximately 350° F. (180° C.) for 24 hours, after which it is cooled to 200° F. (94° C.), and 25 milliliters naphtha is added with continuous stirring for about 15 minutes. Six grams of this homogeneous mixture is poured onto 100 grams of water wet rhyolite aggregate, mixed well, and the coating resulting is inspected visually. The effectiveness of the coating of the wet rhyolite is approximated by visually approximating the percentage of the total aggregate surface to which the asphalt is bonded.

After this evaluation, the coated aggregate is air cured for one hour at room temperature and thereafter immersed in distilled water for not less than one week. The permanence of the bond between the asphalt and the aggregate is evaluated by inspecting the coated aggregate. The percentage of the total surface of aggregate to which the asphalt remains bonded after the immersion period is a measure of the antistripping resistance, the latter being reported as the percentage of the aggregate surface coated with the asphalt.

The results of additives, including the one of the present invention, as tested by the above mentioned method, are as follows:

TABLE II

| Additive | Effectiveness in Coating Wet Rhyolite, Percent | Antistripping Resistance, Percent |
|---|---|---|
| None (Control) | 15 | 10 |
| A | 15 | 15 |
| B | 95 | 90 |
| C | 70 | 70 |
| D | 80 | 80 |
| E | 40 | 40 |
| F | 95 | 95 |

Additives A–E were 1-(2-aminoethyl), 2-acyl imidazoline-1,3 having the structural formula:

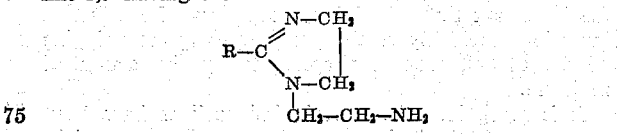

and prepared by the reaction of a long chain aliphatic acid, or mixtures of long chain acids, with diethylenetriamine. The group R was derived for each additive from the following acids:

A. Coco fatty acids
B. Oleic acid
C. Distilled tall oil fatty acids
D. Hydrogenated tallow fatty acids
E. Mixture of caproic and caprylic acids Composition F was the product of the foregoing example.

The invention is hereby claimed as follows:

1. The reaction product of a tall oil fatty acid mixture containing at least 70% by weight of fatty acids having a molecular weight in the range of 235–280 and a polyalkylene polyamine mixture consisting essentially of 75–90% diethylenetriamine, 5–15% triethylenetetramine, and 5–10% tetraethylenepentamine, said reaction product being prepared by heating the two said mixtures at 160–190° C. for 60–90 minutes, then at 190–225° C. for 210–360 minutes, and then at 225–250° C. for 210–270 minutes, the reaction product analyzing 85–99% glyoxalidine ring closure and 88–99% total titratables.

2. Asphalt containing a small amount, at least sufficient to improve the stripping resistance of said asphalt from aggregate, of the reaction product of a tall oil fatty acid mixture containing at least 70% by weight of fatty acids having a molecular weight in the range of 235–280 and a polyalkylene polyamine mixture consisting essentially of 75–90% diethylenetriamine, 5–15% triethylenetetramine, and 5–10% tetraethylenepentamine, said reaction product being prepared by heating the two said mixtures at 160–190° C. for 60–90 minutes, then at 190–225° C. for 210–360 minutes, and then at 225–250° C. for 210–270 minutes, the reaction product analyzing 85–99% glyoxalidine ring closure and 88–99% total titratables.

References Cited in the file of this patent

UNITED STATES PATENTS

| | | |
|---|---|---|
| 2,361,488 | Mikeska | Oct. 31, 1944 |
| 2,508,924 | Mertens | May 23, 1950 |
| 2,766,132 | Blair et al. | Oct. 9, 1956 |